(12) United States Patent
Morisaki

(10) Patent No.: US 8,589,159 B2
(45) Date of Patent: Nov. 19, 2013

(54) KEYWORD DISPLAY SYSTEM, KEYWORD DISPLAY METHOD, AND PROGRAM

(75) Inventor: Mitsunori Morisaki, Tokyo (JP)

(73) Assignee: NEC Corporation, Tokyo (JP)

( * ) Notice: Subject to any disclaimer, the term of this patent is extended or adjusted under 35 U.S.C. 154(b) by 381 days.

(21) Appl. No.: 13/089,469

(22) Filed: Apr. 19, 2011

(65) Prior Publication Data

US 2011/0264444 A1 Oct. 27, 2011

(30) Foreign Application Priority Data

Apr. 22, 2010 (JP) ................................. 2010-098595

(51) Int. Cl.
*G10L 15/26* (2006.01)

(52) U.S. Cl.
USPC ............................ 704/235; 704/246; 704/250

(58) Field of Classification Search
USPC .......................................... 704/235, 246, 250
See application file for complete search history.

(56) References Cited

U.S. PATENT DOCUMENTS

| 8,185,391 | B2 * | 5/2012 | Das ............................... | 704/246 |
| 2004/0107100 | A1 * | 6/2004 | Lu et al. ....................... | 704/238 |
| 2011/0224979 | A1 * | 9/2011 | Raux ............................. | 704/233 |

FOREIGN PATENT DOCUMENTS

| JP | 10-69482 A | 3/1998 |
| JP | 2002290939 A | 10/2002 |
| JP | 2007193380 A | 8/2007 |

OTHER PUBLICATIONS

Mitsumasa Kondo et al. "Related Term Extraction Using Term Importance", The 23rd Annual Conference of the Japanese Society 5 for Artificial Intelligence in 2009, Jun. 19, 2009, 2G1-NFC5-3, pp. 1-4.
Japanese Office Action for JP2010-098595 issued Dec. 28, 2011.
S. Okamoto et al., "Support System for Customer Center", Jinko Chino Gakkaishi, vol. 15, No. 6, Nov. 2000, pp. 1027-1034.
K. Misue et al., "Visualization of Keyword Association for Text Mining", IPSJ SIG Notes, Information Processing Society of Japan, vol. 99, No. 57, Jul. 1999, pp. 65-72.
Japanese Office Action for JP Application No. 2010-098595 mailed on Jul. 18, 2012 with Partial English Translation.

* cited by examiner

*Primary Examiner* — Daniel D Abebe

(57) ABSTRACT

The present invention is a keyword display system that includes a speaker specifier for specify a speaker; a weight determinator for determining a weight of the specified speaker; a keyword extractor for extracting keywords from a speech of the aforementioned speaker; a keyword relation degree calculator for calculating a relation degree between the aforementioned extracted keywords, carrying out a weighting for this calculated relation degree by using the weight of the speaker having spoken the aforementioned keywords, and calculating a keyword relation degree between the keywords; and a keyword display controller for displaying a relevancy between the aforementioned extracted keywords responding to the aforementioned keyword relation degree.

15 Claims, 5 Drawing Sheets

| SPEAKER | TELEPHONE NUMBER | WEIGHT |
|---|---|---|
| SPEAKER A | X X X X X | 2 |
| SPEAKER B | Y Y Y Y Y | 1 |
| SPEAKER C | Z Z Z Z Z | 1.5 |
| ... | ... | ... |

KEYWORD DISPLAY SYSTEM, KEYWORD DISPLAY METHOD, AND PROGRAM

INCORPORATION BY REFERENCE

This application is based upon and claims the benefit of priority from Japanese patent application No. JP2010-098595, filed on Apr. 22, 2010, the disclosure of which is incorporated herein in its entirety by reference.

BACKGROUND OF THE INVENTION

The present invention relates to a keyword display system, a keyword display method, and a program.

The technology of extracting keywords from conversational information, and arranging a relevancy between the keywords on a two-dimensional space is described in Patent Literature 1.

So as to activate a participating conversation at any time, thereby making creativity of the conversation stronger, "the topic processor" described in the Patent Literature 1 enables a speech sentence processing module to perform a morpheme analysis for speeches of respective participants and to extract keywords, a conversation structuring module to successively arrange a relevancy between the keyword and the speech on a two-dimensional space and to structure contents of the conversation, a topic developing condition recognition module to grasp developing conditions of a topic from the contents of the conversation and transition information of the speech, and a topic providing module to extract and provide information that becomes a subject of the topic in response to detection of a change in the topic by a topic providing module activation module.

Further, the above-described Patent literature 1 has an advantage that it is easy to visually recognize a relevancy between the keywords because the keywords are extracted from the participating conversations and are arranged two-dimensionally by causing them to correspond to the topic.

PTL 1: JP-P1998-69482A

By the way, the daily conversation is made with footings of respective speakers taken into consideration. For example, in a certain project, importance is attached to the speech of a person in charge of the above project as compared with the speeches of other persons participating in the above project, and a relevancy between the keyword that a person in charge of the project has spoken and its related keyword becomes very important at the moment of promoting the project.

For example, in the project, there exist not only a person in charge of the above project but also leaders by each group, and a relevancy between the keywords to be extracted from the conversation between a person in charge of a project and a group leader of the above project is not identical to a relevancy between the keywords to be extracted from the conversation between a group leader of the project and a mere participant of the project from a viewpoint of importance attached hereto.

The technology of the Patent literature 1, however, exclusively pays attention only to the keywords that are spoken during conversation without taking the position and footing of the speaker into consideration.

SUMMARY OF THE INVENTION

Thereupon, the present invention has been accomplished in consideration of the above-mentioned problems, and an object thereof is to provide a keyword display system for, during conversation, displaying a relevancy between the keywords that are extracted from the conversation by taking the position and footing of a person having the above conversation into consideration, a keyword display method therefor, and a program therefor.

The present invention for solving the above-mentioned problems is a keyword display system, comprising: a speaker specifier that specifies a speaker; a weight determinator that determines a weight of the specified speaker; a keyword extractor that extracts keywords from a speech of the speaker; a keyword relation degree calculator that calculates a relation degree between the extracted keywords, carries out a weighting for this calculated relation degree by using the weight of the speaker having spoken the keywords, and calculates a keyword relation degree between the keywords; and a keyword display controller that displays a relevancy between the extracted keywords responding to the keyword relation degree.

The present invention for solving the above-mentioned problems is a keyword display method of specifying a speaker of a conversation; determining a weight of the specified speaker; extracting keywords from a speech of the aforementioned speaker; calculating a relation degree between the aforementioned extracted keywords, carrying out a weighting for this calculated relation degree by using the weight of the speaker having spoken the aforementioned keywords, calculating a keyword relation degree between the keywords; and displaying a relevancy between the aforementioned extracted keywords responding to the aforementioned keyword relation degree.

The present invention for solving the above-mentioned problems is a non-transitory computer readable storage medium storing a program for causing an information processing device to execute: a process of specifying a speaker of a conversation; a process of determining a weight of the specified speaker; a process of extracting keywords from a speech of the aforementioned speaker; a process of calculating a relation degree between the aforementioned extracted keywords, carrying out a weighting for this calculated relation degree by using the weight of the speaker having spoken the aforementioned keywords, and calculating a keyword relation degree between the keywords; and a process of displaying a relevancy between the aforementioned extracted keywords responding to the aforementioned keyword relation degree.

The present invention is capable of displaying the keywords that come out in the conversation in terms of the relevancy between the keywords into which the weight responding to the position and footing of the speaker of the above keywords has been reflected.

BRIEF DESCRIPTION OF THE DRAWINGS

This and other objects, features, and advantages of the present invention will become more apparent upon a reading of the following detailed description and drawings, in which.

EXEMPLARY EMBODIMENTS

The exemplary embodiments of the present invention will be explained.

First Exemplary Embodiment

Figure 1:
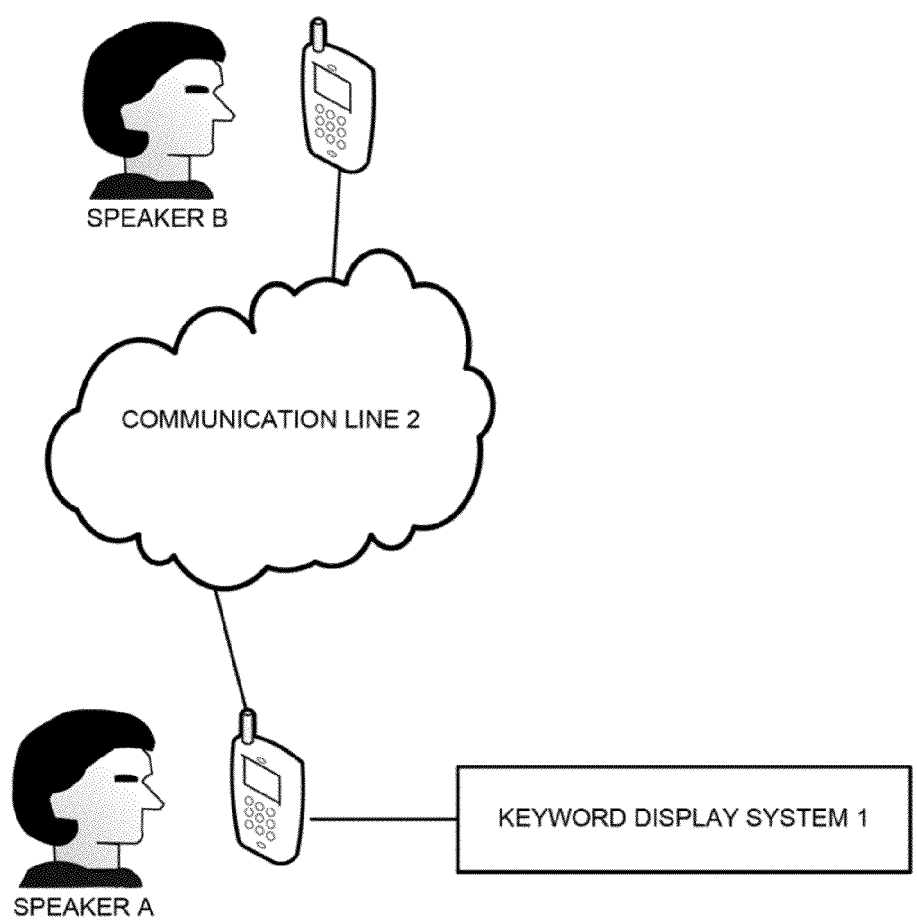
FIG. 1 is a view illustrating an entire configuration of a first exemplary embodiment of the present invention.

FIG. 1 is a view illustrating an entire configuration of the first exemplary embodiment of the present invention.

As shown in FIG. 1, the first exemplary embodiment assumes the case in which a speaker A and a speaker B each using a keyword display system 1 have a conversation with each other via a communication line 2. And, a relevancy between the keywords extracted from the conversation is displayed in the keyword display system 1 of the speaker A.

Figure 2:
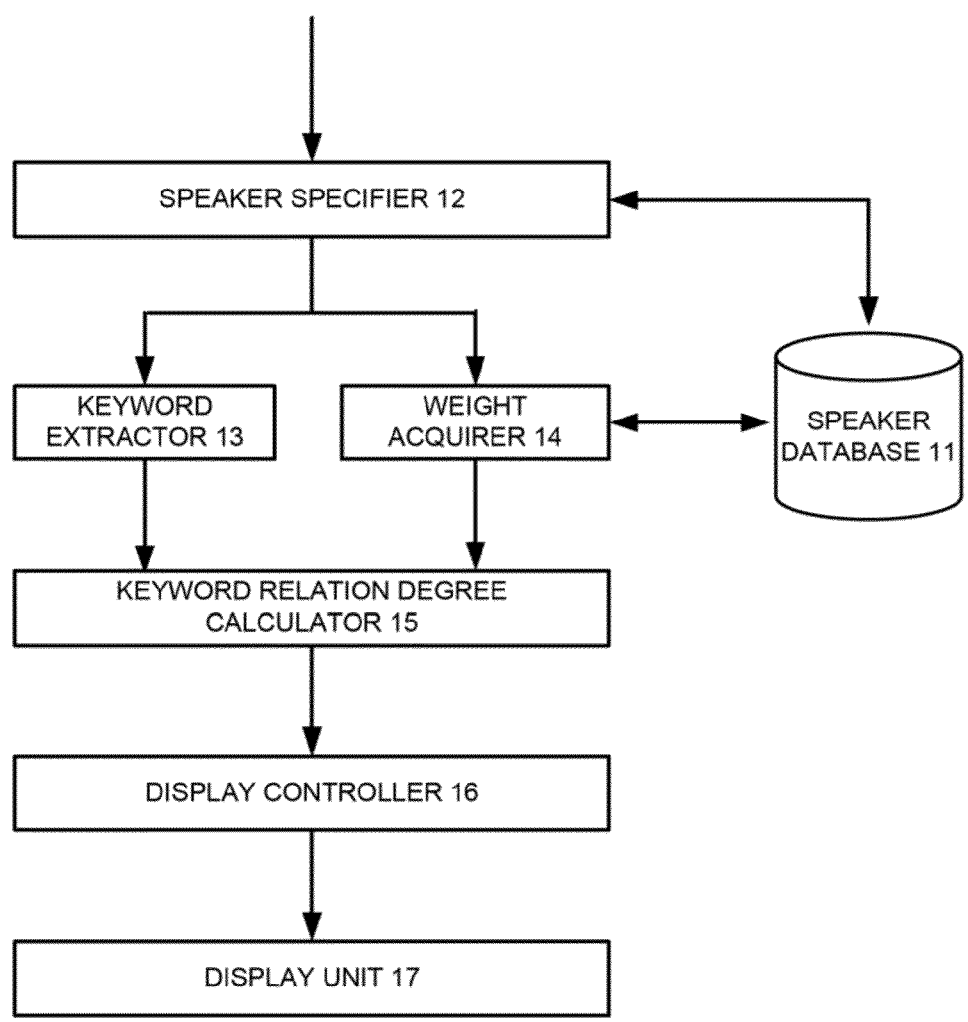
FIG. 2 is a block diagram of a keyword display system 1 of the first exemplary embodiment.

FIG. 2 is a block diagram of the keyword display system 1 of the first exemplary embodiment.

The keyword display system 1 of the first exemplary embodiment, as shown in FIG. 2, includes a speaker database 11, a speaker specifier 12, a keyword extractor 13, a weight acquirer 14, a keyword relation degree calculator 15, a display controller 16, and a display unit 17.

Figures 3, 4:
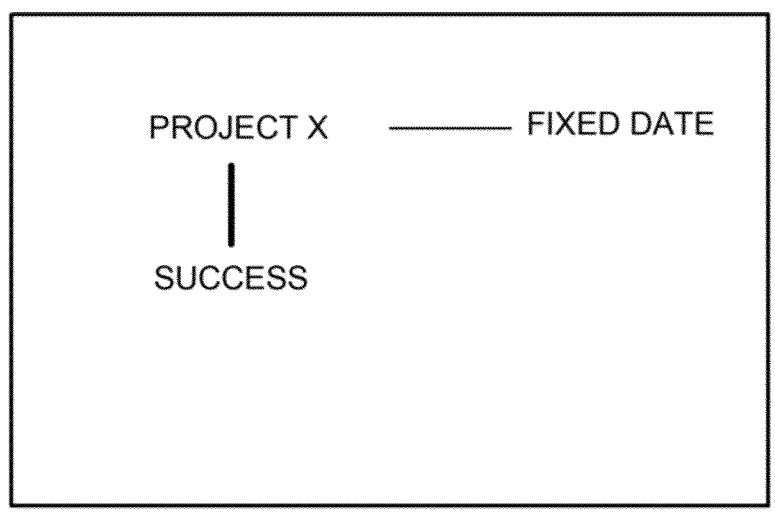
FIG. 3 is a view illustrating one example of a speaker database 11.
FIG. 4 is a view illustrating one example of an emphasized display of the relevancy having a relation degree between the keywords reflected therein.

The speaker database 11 is a database having s speaker, identification information on the communication line 2 of this speaker, and a weight of the above speaker stored therein correspondingly to each other. The identification information on the communication line 2 is, for example, a telephone number, an IP address, or the like. Further, the weight with a larger value is given to a speaker of which the speech has a greater influence in the conversation. Specifically, a person in charge of the project, a senior official, or the like is given the weight with a large value, and a mere assistant or the like is given the weight with a small value. In FIG. 3, one example of the speaker database 11 is shown. In FIG. 3, an example of the case in which the identification information on the communication line 2 is a telephone number is shown, where the speaker A, the telephone number "XXXXX", and the weight that is "2" are caused to correspond to each other, the speaker B, the telephone number "YYYYY", and the weight that is "1" are caused to correspond to each other, and the speaker C, the telephone number "ZZZZZ", and the weight that is "1.5" are caused to correspond to each other.

The speaker specifier 12 specifies the speaker who speaks via the communication line 2 from the speaker database 11, based upon the identification information on the communication line 2. There exists the telephone number, the IP address, or the like as a typified example of the identification information on the communication line 2. Additionally, in this example, the speaker A using the keyword display system 1 has been previously specified by the speaker specifier 12 and stored. The specified speaker is outputted to the keyword extractor 13 together with the speech of above speaker.

Additionally, while the speaker specifier 12 specifies the speaker, for example, by employing the identification information on the communication line 2 such as the telephone number and the IP address in the above-described example, it may specify the speaker by recognizing voice of the speaker by a voice recognition and comparing it with voice data of the speaker.

The keyword extractor 13 extracts the keywords from the conversation between the speaker A and the speaker B. The conventional methods can be employed for extracting the keywords, and there is, for example, the method of, after converting the conversation by each speaker into text data, extracting a noun of which an occurrence frequency is high as the keyword with morpheme analysis etc. The keyword extractor 13 outputs the extracted keyword to the keyword relation degree calculator 15 correspondingly to speaker having spoken this keyword.

The weight acquirer 14 acquires the weight corresponding to the speaker specified by the speaker specifier 12 from the speaker database 11. For example, when the speaker specified by the speaker specifier 12 is the speaker A, the weight acquirer 14 acquires the weight of which value is "2". The acquired weight is outputted to the keyword relation degree calculator 15 correspondingly to the speaker.

The keyword relation degree calculator 15 calculates a relation degree between the keywords extracted by the keyword extractor 13. For example, the relation degree between the keywords is calculated by summing up co-occurrence frequencies of respective keywords, generating a keyword co-occurrence frequency table, and storing the keyword co-occurrence frequencies. Herein, the relation degree between a certain keyword X and a certain keyword Y can be calculated, for example, by substituting the co-occurrence frequency of X and Y listed in the keyword co-occurrence frequency table into i of Numerical equation 1.

$$relevency(X, Y) = \frac{\sum Xi * Yi}{\sqrt{\sum Xi^2} + \sqrt{\sum Yi^2}} \quad \text{[Numerical equation 1]}$$

Next, the keyword relation degree calculator 15 of the first exemplary embodiment furthermore carries out a weighting for the relation degree between the keywords calculated above by using the weight of the speaker having spoken the above keyword. For example, when the relation degree between a certain keyword X and a certain keyword Y is "1", the speaker of the keyword X is the speaker A, and the speaker of the keyword Y is the speaker B, the keyword relation degree calculator 15 carries out the weighting for the keyword relation degree between the keyword X and the keyword Y that is "1" by using the weight of the speaker A and the weight of the speaker B. As a method of the weighting, not only the method of multiplying the relation degree between the keywords by each weight, but also the method of summing up respective weights may be used. And, the keyword relation degree calculator 15 calculates the final weighted keyword relation degree, and outputs a set of the keywords and the keyword relation degree of this set to the display controller 16. Additionally, a configuration may be made so that only the sets of the keywords of which the keyword relation degree exceeds a constant threshold, and the keyword relation degrees of these sets are outputted because many sets of the keywords and the keyword relation degrees of these sets are outputted when the conversation continues.

The display controller 16 controls the display from the set of the keywords and this keyword relation degree in such a manner that the larger the keyword relation degree is, the more strongly the relevancy between the corresponding keywords is emphasized As an example of the method of controlling the emphasized display of the relevancy having the relation degree between the keywords reflected therein, there exit the followings.

(1) In proportion to magnitudes of the keyword relation degrees, a line connecting two keywords corresponding to the above keyword relation degree is thickly displayed. In FIG. 4, a display example of this exemplary embodiment in the case that the keyword relation degree between the keywords (project X, success) is "9", and the keyword relation degree between the keywords (project X, fixed date) is "3" is shown. In FIG. 4, responding to the keyword relation degree, the thickness of the line connecting the keyword "project X" and the keyword "success" is three times as large as that of the line connecting the keyword "project X" and the keyword "fixed date". Additionally, magnitudes of the keyword relation degrees may be classified for each predetermined range to decide the thickness of the line for each classification.

Further, the kind of the line connecting two keywords may be changed. For example, a dotted line, a solid line, and a double line may be used in proportion to the magnitudes of the keyword relation degrees. In this case, the magnitudes of the keyword relation degrees are preferably classified for each predetermined range to decide the kind of the line for each classification in such a manner of a dotted line, a solid line, and a double line.

Figure 5:
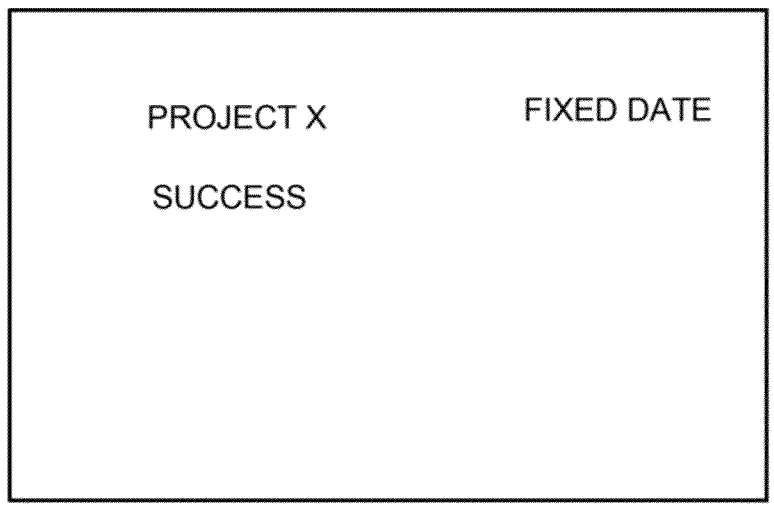
FIG. 5 is a view illustrating one example of an emphasized display of the relevancy having a relation degree between the keywords reflected therein.

(2) There exists the method of, in proportion to the magnitudes of the keyword relation degrees, shortening the displaying distance between two keywords corresponding to the above keyword relation degree. In FIG. 5, a display example of this exemplary embodiment in the case that the keyword relation degree between the keywords (project X, success) is "9", and the keyword relation degree between the keywords (project X, fixed date) is "3" is shown. In FIG. 5, responding to the keyword relation degrees, the distance between the displaying position of the keyword "project X" and that of the keyword "fixed date" is three times as large as the distance between the displaying position of the keyword "project X" and that of the keyword "success". Additionally, the magnitudes of the keyword relation degrees may be classified for each predetermined range to decide the distance of the displaying position for each classification stepwise.

(3) In proportion to the magnitudes of the keyword relation degrees, the color of the line connecting two keywords corresponding to the above keyword relation degree is changed. For example, when the keyword relation degree is small, the color of the line is defined to be a black color, and as the keyword relation degree becomes large, the color is changed from an orange color to a pink color and to a red color.

Additionally, magnitudes of the keyword relation degrees may be classified for each predetermined range to decide the color of the line for each classification. Further, the color of the line is not limited hereto, and the color that a user regards as an important color may be appropriately selected.

The above-mentioned display method is only one example, and, in addition hereto, the method of changing the color of the keyword responding to the magnitudes of the keyword relation degrees, and the method of grouping the related keywords having the keyword relation degree equal to or more than a predetermined threshold, and displaying them may be used.

Next, an operation will be explained by employing specific examples.

In the following explanation, an example in which the speaker A and the speaker B have a conversation with each other via the telephone is supposed, and it is assumed that the speaker A uses the keyword display system 1.

At first, it is assumed that the speaker B makes a telephone call to the speaker A in order to have conversation.

The speaker specifier 12 of the keyword display system 1 of the speaker A retrieves the telephone number of the speaker B from the speaker database 11, and specifies that a call partner is the speaker A. And, the speaker specifier 12 outputs the fact that the user who is using the keyword display system 1 is the speaker A and the communication partner is the speaker B to the keyword extractor 13 and the weight acquirer 14.

The keyword extractor 13 extracts the keywords from the conversation between the speaker A and the speaker B. Herein it is assumed that the speaker A has spoken that "I will absolutely succeed in the project X". It is assumed that the keywords of "project X" and "success" have been extracted from this speech. Then, (project X, speaker A) and (success, speaker A) each of which is a set of the keyword and the speaker of the above keyword are outputted to the keyword relation degree calculator 15. Further, it is assumed that the speaker B has spoken that "when does the fixed date of the project X expire?" in response to this speech. It is assumed that the keywords of "project X" and "fixed date" have been extracted from this speech. Then, (project X, speaker B) and (success, speaker B) each of which is a set of the keyword and the speaker of the above keyword are outputted to the keyword relation degree calculator 15.

On the other hand, the weight acquirer 14 retrieves and acquires the weights of the speaker A and the speaker B specified by the speaker specifier 12 from the speaker database 11. Herein, according to an example of FIG. 3, "2", being the weight of the speaker A, and "1", being the weight of the speaker B, are acquired, and (speaker A, 2) and (speaker B, 1) each of which is a set of the speaker and the weight thereof are outputted.

The keyword relation degree calculator 15 inputs a set of the keyword and the speaker thereof from the keyword extractor 13, and calculates the keyword relation degree between the keywords. Herein, it is assumed that the keyword relation degree between "project X" and "success" is "1", and the keyword relation degree between "project x" and "fixed date" is "1".

Continuously, the keyword relation degree calculator 15 carries out the weighting for the calculated keyword relation degree by using the weight of the speaker acquired by the weight acquirer 14.

In this example, the relation degree "1" between "project X" and "success" is multiplied by the weight of the speaker A having spoken the above keywords. In this example, for the relation degree "1", the final keyword relation degree is 1×2×2=4 because the weight of the speaker A having spoken "project X" and "success" is "2".

Further, the relation degree "1" between "project X" and "fixed date" is multiplied by the weight of the speaker B having spoken the above keywords. In this example, for the relation degree "1", the final keyword relation degree is 1×2×1=2 because the weight of the speaker A having spoken "project X" is "2" and the weight of the speaker B having spoken "fixed date" is "1". Additionally, while both of the speaker A and the speaker B have spoken the keyword of "project X", the speaker of which the weight is heavier is selected.

And, the keyword relation degree calculator 15 outputs (project X, success, 4) and (project X, fixed date, 2) each of which is a set of the keywords and the keyword relation degree of the above set to the display controller 16.

The display controller 16 inputs (project X, success, 4) and (project X, fixed date, 2) each of which is a set of the keywords and the keyword relation degree of the above set, and displays the keywords responding to the keyword relation degree.

Figure 6:
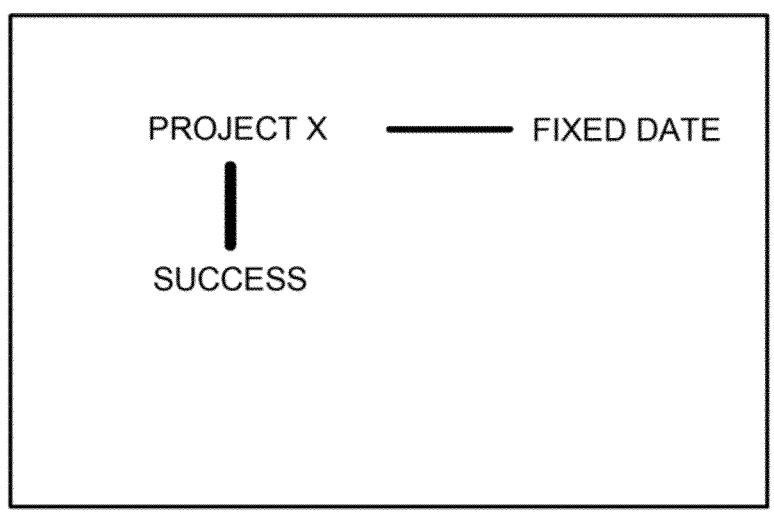
FIG. 6 is a view illustrating one example of an emphasized display of the relevancy based upon a specific example of the present invention.

In this example, as shown in FIG. 6, the thickness of the line connecting the keyword "project X" and the keyword "success" is displayed in such a manner that it is twice as large as the thickness of the line connecting the keyword "project X" and the keyword "fixed date" because the keyword relation degree between the keywords (project X, success) is "4", and the keyword relation degree between the keywords (project X, fixed date) is "2".

As mentioned above, the first exemplary embodiment of the present invention makes it possible to visually recognize importance between the keywords in a clear manner as compared with the conventional case in which the position and footing of the speaker are not reflected into the keyword relation degree because the keyword coming out in the conversation is displayed based upon the keyword relation degree having the weight responding to the position and footing of the above speaker reflected therein, in terms of the relevancy between the keywords.

Second Exemplary Embodiment

The second exemplary embodiment will be explained.

The example in which the speaker A used the keyword display system was explained in the first exemplary embodiment. However, the display system is made more convenient if the display of the keyword can be shared among many speakers.

Thereupon, in the second exemplary embodiment, an example in which the display of the keyword is shared among many speakers will be explained.

Figure 7:
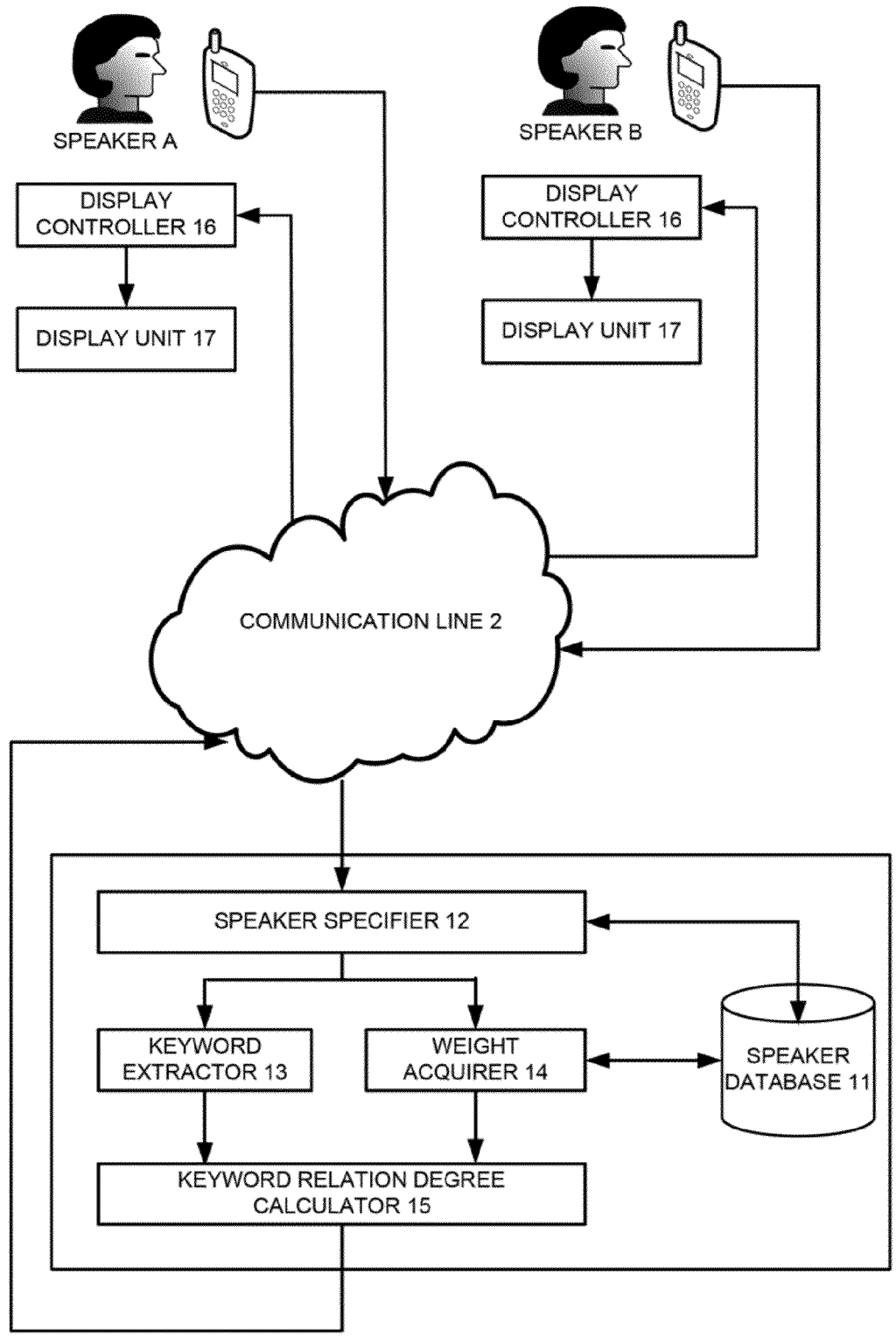
FIG. 7 is a system configuration view of a second exemplary embodiment.

FIG. 7 is a system configuration view of the second exemplary embodiment.

The second exemplary embodiment, which is similar to the first exemplary embodiment in a basic configuration, differs from the first exemplary embodiment in a point that the speaker database 11, the speaker specifier 12, the keyword extractor 13, the weight acquirer 14, and the keyword relation degree calculator 15 are shared among the speakers (hereinafter, described as a shared system), and the display controller 16 and the display unit 17 are possessed by each speaker.

The conversation between the speaker A and the speaker B via the telephone goes through the shared system temporarily, and is delivered to the call partner.

The speaker specifier 12 specifies the speaker A and the speaker B with the telephone numbers of the speaker A and the speaker B or the like, and thereafter, the above speakers are outputted to the keyword extractor 13 together with the speech thereof.

The keyword extractor 13 extracts the keyword from the conversation between the speaker A and the speaker B, and outputs the extracted keyword and the speaker having spoken the above keyword correspondingly to each other to the keyword relation degree calculator 15.

The weight acquirer 14 acquires the weight corresponding to the speaker specified by the speaker specifier 12 from the speaker database 11. The acquired weight is outputted to the keyword relation degree calculator 15 correspondingly to the speaker.

The keyword relation degree calculator 15 calculates the relation degree between the keywords extracted by the keyword extractor 13, and further carries out the weighting for the calculated relation degree between the keywords by using the weight of the speaker having spoken the above keywords. And, the keyword relation degree calculator 15 outputs it to the display controller 16 of each speaker.

The display controller 16 of each speaker carries out the display in which respective keywords and the relation degree between the above keywords have been reflected from a set of the keywords and this keyword relation degree.

In the display unit 17 of each speaker, the keywords extracted from the conversation that each speaker has made, and the relevancy between the above keywords are displayed.

In the second exemplary embodiment, the keywords and the display of the relevancy having the position and footing of the speaker taken into consideration therein can be shared among the speakers, thereby allowing more accurate communication to be realized.

Additionally, while an example in which the speaker database 11, the speaker specifier 12, the keyword extractor 13, the weight acquirer 14, and the keyword relation degree calculator 15 were shared among the speakers was explained in the above-described second embodiment, the configuration is not limited hereto, and a configuration may be made so that the display controller 16 is also shared, and only the display unit 17 is installed in each speaker.

Further, while each of the speaker specifier 12, the keyword extractor 13, the weight acquirer 14, the keyword relation degree calculator 15, and the display controller 16 was configured with hardware in the above-described exemplary embodiments, it may be configured with a program and a CPU that operate similarly to each unit.

An example 1 is a keyword display system, comprising: a speaker specifier that specifies a speaker; a weight determinator that determines a weight of the specified speaker; a keyword extractor that extracts keywords from a speech of the speaker; a keyword relation degree calculator that calculates a relation degree between the extracted keywords, carries out a weighting for this calculated relation degree by using the weight of the speaker having spoken the keywords, and calculates a keyword relation degree between the keywords; and a keyword display controller that displays a relevancy between the extracted keywords responding to the keyword relation degree.

An example 2 is a keyword display system according to the example 1 in that the keyword display controller carries out a display in such a manner that the larger the keyword relation degree is, the more strongly the relevancy between the corresponding keywords is emphasized.

An example 3 is a keyword display system according to the example 2, in that the emphasized display of the relevancy between the keywords is carried out by employing one of a thickness of a line indicative of the relevancy between the keywords, a distance between displaying positions of the keywords, and a color of a line indicative of the relevancy between the keywords, or a combination thereof.

An example 4 is a keyword display system according to the example 3 in that the keyword display controller displays the thickness of the line indicative of the relevancy between the keywords in such a manner that it becomes bigger as the keyword relation degree becomes larger.

An example 5 is a keyword display system according to the example 3 in that the keyword display controller displays the distance between the displaying positions of the keywords in such a manner that it becomes shorter as the keyword relation degree becomes larger.

An example 6 is a keyword display system according to the example 3 in that the keyword display controller changes the color of the line indicative of the relevancy between the keywords in such a manner that it becomes a red color as the keyword relation degree becomes larger.

An example 7 is a keyword display system according to the example 1 in that the speaker specifier specifies the speaker based upon one of a telephone number, an IP address, and a voice recognition, or a combination thereof.

An example 8 is a keyword display method, comprising: specifying a speaker of a conversation; determining a weight of the specified speaker; extracting keywords from a speech of the speaker; calculating a relation degree between the extracted keywords, carrying out a weighting for this calculated relation degree by using the weight of the speaker having spoken the keywords, and calculating a keyword relation degree between the keywords; and displaying a relevancy between the extracted keywords responding to the keyword relation degree.

An example 9 is a keyword display method according to the example 8 in that the keyword display method carrying out a display in such a manner that the larger the keyword relation degree is, the more strongly the relevancy between the corresponding keywords is emphasized.

An example 10 is a keyword display method according to the example 9 in that the emphasized display of the relevancy between the keywords is carried out by employing one of a thickness of a line indicative of the relevancy between the keywords, a distance between displaying positions of the keywords, and a color of a line indicative of the relevancy between the keywords, or a combination thereof.

An example 11 is a keyword display method according to the example 10 in that the keyword display method displaying the thickness of the line indicative of the relevancy between the keywords in such a manner that it becomes bigger as the keyword relation degree becomes larger.

An example 12 is a keyword display method according to the example 10 in that the keyword display method displaying the distance between the displaying positions of the keywords in such a manner that it becomes shorter as the keyword relation degree becomes larger.

An example 13 is a keyword display method according to the example 10 in that the keyword display method changing the color of the line indicative of the relevancy between the keywords in such a manner that it becomes a red color as the keyword relation degree becomes larger.

An example 14 is a keyword display method according to the example 8, the keyword display method specifying the speaker based upon one of a telephone number, an IP address, and a voice recognition, or a combination thereof.

An example 15 is a non-transitory computer readable storage medium storing a program for causing an information processing device to execute: a process of specifying a speaker of a conversation; a process of determining a weight of the specified speaker; a process of extracting keywords from a speech of the speaker; a process of calculating a relation degree between the extracted keywords, carrying out a weighting for this calculated relation degree by using the weight of the speaker having spoken the keywords, and calculating a keyword relation degree between the keywords; and a process of displaying a relevancy between the extracted keywords responding to the keyword relation degree.

Above, while the present invention has been particularly shown and described with reference to preferred exemplary embodiments, the present invention is not limited to the above mentioned exemplary embodiments. It will be understood by those of ordinary skill in the art that various changes in form and details may be made therein without departing from the spirit and scope of the present invention as defined by the claims.

What is claimed is:

1. A keyword display system, comprising:
   a speaker specifier that specifies a speaker;
   a weight determinator that determines a weight of the specified speaker;
   a keyword extractor that extracts keywords from a speech of said speaker;
   a keyword relation degree calculator that calculates a relation degree between said extracted keywords, carries out a weighting for this calculated relation degree by using the weight of the speaker having spoken said keywords, and calculates a keyword relation degree between the keywords; and
   a keyword display controller that displays a relevancy between said extracted keywords responding to said keyword relation degree.

2. A keyword display system according to claim 1, wherein said keyword display controller carries out a display in such a manner that the larger said keyword relation degree is, the more strongly the relevancy between the corresponding keywords is emphasized.

3. A keyword display system according to claim 2, wherein said emphasized display of the relevancy between the keywords is carried out by employing one of a thickness of a line indicative of the relevancy between the keywords, a distance between displaying positions of the keywords, and a color of a line indicative of the relevancy between the keywords, or a combination thereof.

4. A keyword display system according to claim 3, wherein said keyword display controller displays the thickness of the line indicative of the relevancy between the keywords in such a manner that it becomes bigger as said keyword relation degree becomes larger.

5. A keyword display system according to claim 3, wherein said keyword display controller displays the distance between the displaying positions of the keywords in such a manner that it becomes shorter as said keyword relation degree becomes larger.

6. A keyword display system according to claim 3, wherein said keyword display controller changes the color of the line indicative of the relevancy between the keywords in such a manner that it becomes a red color as said keyword relation degree becomes larger.

7. A keyword display system according to claim 1, wherein said speaker specifier specifies the speaker based upon one of a telephone number, an IP address, and a voice recognition, or a combination thereof.

8. A keyword display method, comprising:
   specifying a speaker of a conversation;
   determining a weight of the specified speaker;
   extracting keywords from a speech of said speaker;
   calculating a relation degree between said extracted keywords, carrying out a weighting for this calculated relation degree by using the weight of the speaker having spoken said keywords, and calculating a keyword relation degree between the keywords; and
   displaying a relevancy between said extracted keywords responding to said keyword relation degree.

9. A keyword display method according to claim 8, said keyword display method carrying out a display in such a manner that the larger said keyword relation degree is, the more strongly the relevancy between the corresponding keywords is emphasized.

10. A keyword display method according to claim 9, wherein said emphasized display of the relevancy between the keywords is carried out by employing one of a thickness of a line indicative of the relevancy between the keywords, a distance between displaying positions of the keywords, and a color of a line indicative of the relevancy between the keywords, or a combination thereof.

11. A keyword display method according to claim 10, said keyword display method displaying the thickness of the line indicative of the relevancy between the keywords in such a manner that it becomes bigger as said keyword relation degree becomes larger.

12. A keyword display method according to claim 10, said keyword display method displaying the distance between the displaying positions of the keywords in such a manner that it becomes shorter as said keyword relation degree becomes larger.

13. A keyword display method according to claim 10, said keyword display method changing the color of the line indicative of the relevancy between the keywords in such a manner that it becomes a red color as said keyword relation degree becomes larger.

14. A keyword display method according to claim 8, said keyword display method specifying the speaker based upon one of a telephone number, an IP address, and a voice recognition, or a combination thereof.

15. A non-transitory computer readable storage medium storing a program for causing an information processing device to execute:

a process of specifying a speaker of a conversation;

a process of determining a weight of the specified speaker;

a process of extracting keywords from a speech of said speaker;

a process of calculating a relation degree between said extracted keywords, carrying out a weighting for this calculated relation degree by using the weight of the speaker having spoken said keywords, and calculating a keyword relation degree between the keywords; and a process of displaying a relevancy between said extracted keywords responding to said keyword relation degree.

* * * * *